(12) United States Patent
Sato

(10) Patent No.: US 7,281,983 B2
(45) Date of Patent: Oct. 16, 2007

(54) GAMING SYSTEM AND METHOD USING INCOMING COMMUNICATIONS HISTORY DATA FOR VARIABILITY

(75) Inventor: Kazunobu Sato, Tokyo (JP)

(73) Assignee: Aruze Corp., Tokyo (JP)

( * ) Notice: Subject to any disclaimer, the term of this patent is extended or adjusted under 35 U.S.C. 154(b) by 252 days.

(21) Appl. No.: 10/933,491

(22) Filed: Sep. 3, 2004

(65) Prior Publication Data

US 2005/0049044 A1    Mar. 3, 2005

(30) Foreign Application Priority Data

Sep. 3, 2003    (JP) ............................ P2003-311629
Aug. 16, 2004   (JP) ............................ P2004-236736

(51) Int. Cl.
A63F 13/00    (2006.01)
(52) U.S. Cl. ......................................... 463/40
(58) Field of Classification Search .................. 463/16, 463/30, 37, 39, 40–43
See application file for complete search history.

(56) References Cited

U.S. PATENT DOCUMENTS

| 5,470,081 | A | 11/1995 | Sato et al. |
| 6,511,376 | B2* | 1/2003 | Walker et al. ................. 463/21 |
| 6,554,707 | B1* | 4/2003 | Sinclair et al. ............... 463/39 |
| 2003/0109300 | A1 | 6/2003 | Walker et al. |
| 2005/0054378 | A1* | 3/2005 | Sato ........................ 455/556.1 |

FOREIGN PATENT DOCUMENTS

| JP | 3-193074 | 8/1991 |
| JP | 6-238031 | 8/1994 |

* cited by examiner

*Primary Examiner*—Kim Nguyen
(74) *Attorney, Agent, or Firm*—Leydig, Voit & Mayer, Ltd.

(57) ABSTRACT

A gaming machine, having image displaying device for displaying an image and operation input device, inputs incoming history data indicating a history of incomings from the outside, generates an execution variable to change a progress of game by use of the inputted incoming history data, and executes a game by use of the generated execution variable.

17 Claims, 9 Drawing Sheets

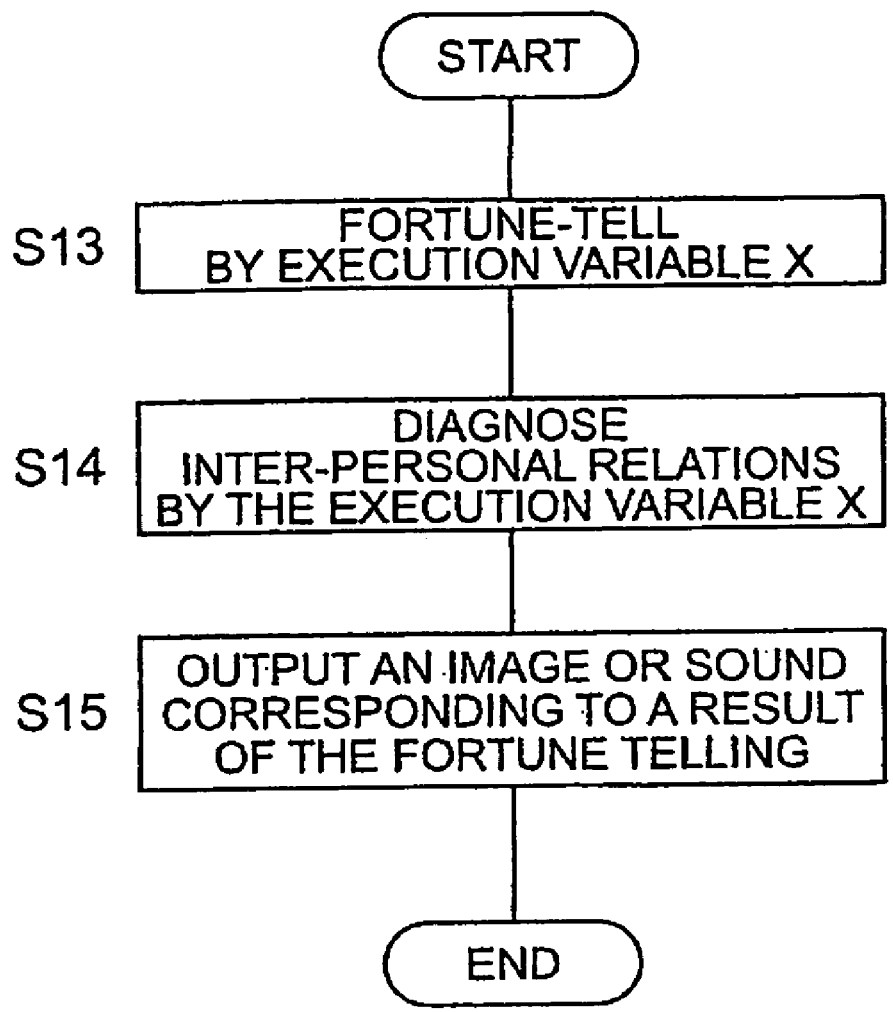

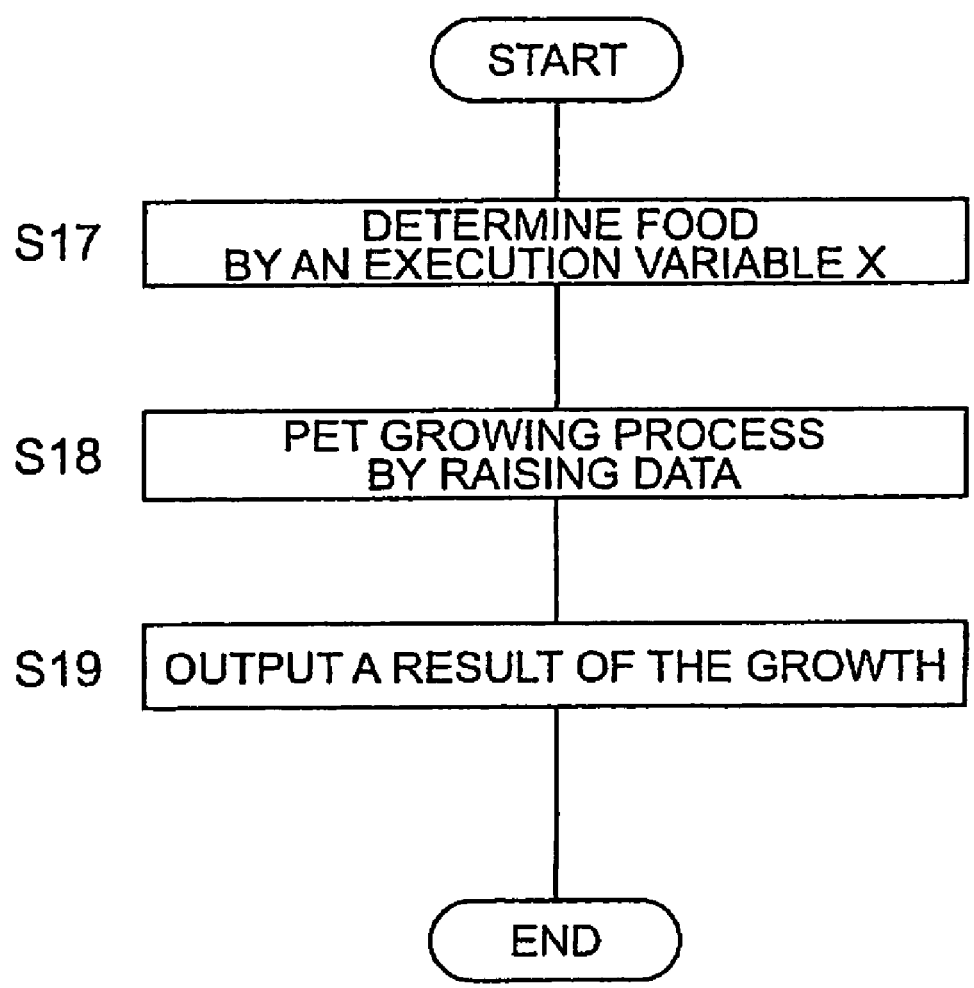

US 7,281,983 B2

GAMING SYSTEM AND METHOD USING INCOMING COMMUNICATIONS HISTORY DATA FOR VARIABILITY

CROSS REFERENCE TO RELATED APPLICATIONS

This application is based upon and claims the benefit of priority from the prior Japanese Patent Application No. 2003-311629, filed on Sep. 3, 2003; 2004-236736, filed on Aug. 16, 2004 the entire contents of which are incorporated herein by reference.

This application is related to co-pending U.S. patent application entitled "MOBILE COMMUNICATION TERMINAL, GAME SERVER AND GAME PROGRAM" referred to as the prior Japanese Patent Application No. 2003-311623, filed in Japan on Sep. 3, 2003; 2004-236733, filed in Japan on Aug. 16, 2004. The co-pending application including specification, drawing and claims are expressly incorporated herein by reference in its entirety.

BACKGROUND OF THE INVENTION

1. Field of the Invention

The present invention relates to a gaming machine, a game supplying system, and a game program, which have a constitution for changing an operation in response to an incoming history.

2. Related Background Art

Heretofore, various gaming machines have been known which are constituted to enable players to enjoy playing games. Among them has been a gaming machine which has reading device for reading a bar code on a bar coded card and executing device for a match-up game played with cards in accordance with information read by the reading device (for example, see Japanese Patent Laid-open No.1991-193074:Patent Document 1).

In addition, there has been a gaming machine which has a bar code scanner for reading a bar code printed on bottled and steel canned merchandise and the like, and which is constituted to use information read by the bar code scanner as a bar code for a match-up game (for example, see Japanese Patent Laid-open No.1994-238031: Patent Document 2).

SUMMARY OF THE INVENTION

As done by the aforementioned gaming machines, when a bar code which has been read is used for execution of a game, a result of the match-up can be changed, and a progress of game can be changed, each time a different bar code is used.

However, in order to change a progress of game and make the change extensive, as many bar codes as possible have to be collected. In this point, the gaming machine described in Patent Document 1 requires many bar coded cards to be collected, and is troublesome. In addition, the gaming machine described in Patent Document 2 requires not cards but bottled and steel canned merchandise to be collected in a large number and in a variety of kinds. This is not only troublesome, but also adds up costs for purchasing merchandise and the like. If bar coded cards or pieces of merchandise are decreased in number in order to avoid these troubles, variations of a game decrease, and the game is deprived of fun.

With this taken into account, the present invention has been made in order to solve the aforementioned problems.

An object of the present invention is to provide a gaming machine, a game supplying system, and a game program, which have a constitution for making a progress of game change extensively with saving trouble and reducing costs, and for enabling a user to play an amusing game.

In order to solve the aforementioned problems, the present invention is characterized by a gaming machine having image displaying device for displaying an image and operation input device for performing a operation input of information to be used for the execution of a game, the gaming machine comprises: incoming history data inputting device for inputting incoming history data indicating an incoming history from the outside; execution variable generating unit for generating an execution variable for changing a progress of game by use of the incoming history data inputted by the incoming history data inputting device; and game executing unit for executing a game by use of the execution variable generated by the execution variable generating unit.

Since this gaming machine executes the game by use of the incoming history data which are to be updated from time to time, and whose update timing is irregular, the gaming machine can change a progress of game to an extent of being unpredictable even if the gaming machine remains at a certain position.

In addition, the gaming machine may further comprise incoming history data storing device for storing incoming history data and extracting unit for extracting incoming history data satisfying a predetermined condition out of incoming history data stored in the incoming history data storing device, and the execution variable generating unit may generate an execution variable by use of incoming history data extracted by the extracting unit.

This gaming machine stores incoming history data, and generates an execution variable by use of incoming history data satisfying a predetermined condition out of the stored incoming history data. For this reason, a progress of game can be changed to an extent of being unpredictable even if the number of incomings is large.

The execution variable generating unit may be configured to generate an execution variable by use of a plurality of assistant variables generated through such a procedure that at least one of the plurality of assistant variables is random.

In addition, with regard to this gaming machine, it is preferable that the game executing unit may comprise generating unit for generating, by an execution variable, fortune telling data indicating a result of a fortune telling, and changing unit for making an instruction for changing the displaying of the image on image displaying device by the fortune telling data generated by the generating unit.

In this case, the gaming machine can execute a fortune telling game whose progress changes based on incoming history data.

Furthermore, the game executing unit may comprise: generating unit for generating, by an execution variable, raising data for determining growth contents of an object to be raised; and changing unit for making an instruction for changing the displaying of an image on the image displaying device by the raising data which have been generated by the generating unit.

In this case, the gaming machine can execute a pet raising game whose progress changes based on incoming history data.

The present invention provides a game supplying system which includes: a gaming machine having image displaying device for displaying an image and operation input device for performing an operation input of information to be used for the execution of a game; and an incoming history data supplying machine for supplying incoming history data indicating an incoming history to the gaming machine. The gaming machine inputs the incoming history data supplied from the incoming history data supplying machine. In addition, the gaming machine comprises: execution variable generating unit for generating an execution variable in order to change a progress of game by use of the inputted incoming history data; and game executing unit for executing a game by use of an execution variable generated by the execution variable generating unit.

According to this game system, even if nothing but the gaming machine and the incoming history data supplying machine is available, a game which is so varied that a progress of game is unpredictable can be executed in the gaming machine.

The present invention provides a game supplying system which includes: a gaming machine having image displaying device for displaying an image and operation input device for performing a operation input of information to be used for execution of a game; and an incoming history data supplying machine. The incoming history data supplying machine comprises: communication device for making wire or wireless communications; incoming history data storing device for storing incoming history data indicating a history of an incoming which has been performed by the communication device; output device for outputting the incoming history data to the outside; and control device for reading the incoming history data which has been stored in the incoming history data storing device, and for inputting the incoming history data to the output device. The gaming machine comprises: incoming history data inputting device for inputting the incoming history data supplied from the incoming history data supplying machine; incoming history data storing device for storing the incoming history data inputted by the incoming history data inputting device; extracting unit for extracting incoming history data satisfying a predetermined condition out of the incoming history data stored in the incoming history data storing device; execution variable generating unit for generating an execution variable in order to change a progress of game by use of the incoming history data extracted by the extracting unit; and game executing unit for executing a game by use of the execution variable generated by the execution variable generating unit.

Also, according to this supplying system, even if nothing but the gaming machine and the incoming history data supplying machine is available, a game which is so varied that a progress of game is unpredictable can be executed in the gaming machine.

Additionally, the present invention provides a carrier wave encoding a sequence of instructions for executing a game in a gaming machine including image displaying device for displaying an image and operation input device for performing an operation input of information to be used for the execution of a game, when executed by the gaming machine, cause the gaming machine to perform the steps of: inputting incoming history data indicating an incoming history from the outside; generating an execution variable to change a progress of game by use of the incoming history data; and executing a game by use of the execution variable.

By causing this carrier wave to be stored in the gaming machine, a game which is so varied that a progress of game is unpredictable can be executed in the gaming machine.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 8 is a flowchart showing an operating sequence of a game executing process to be performed in the gaming machine.

FIG. 9 is a flowchart showing an operating sequence of another game executing process to be performed in the gaming machine.

DESCRIPTION OF THE PREFERRED EMBODIMENTS

A description will be provided below for an embodiment of a gaming machine, a game supplying system and a game program according to the present invention with reference to drawings.

Figure 1:
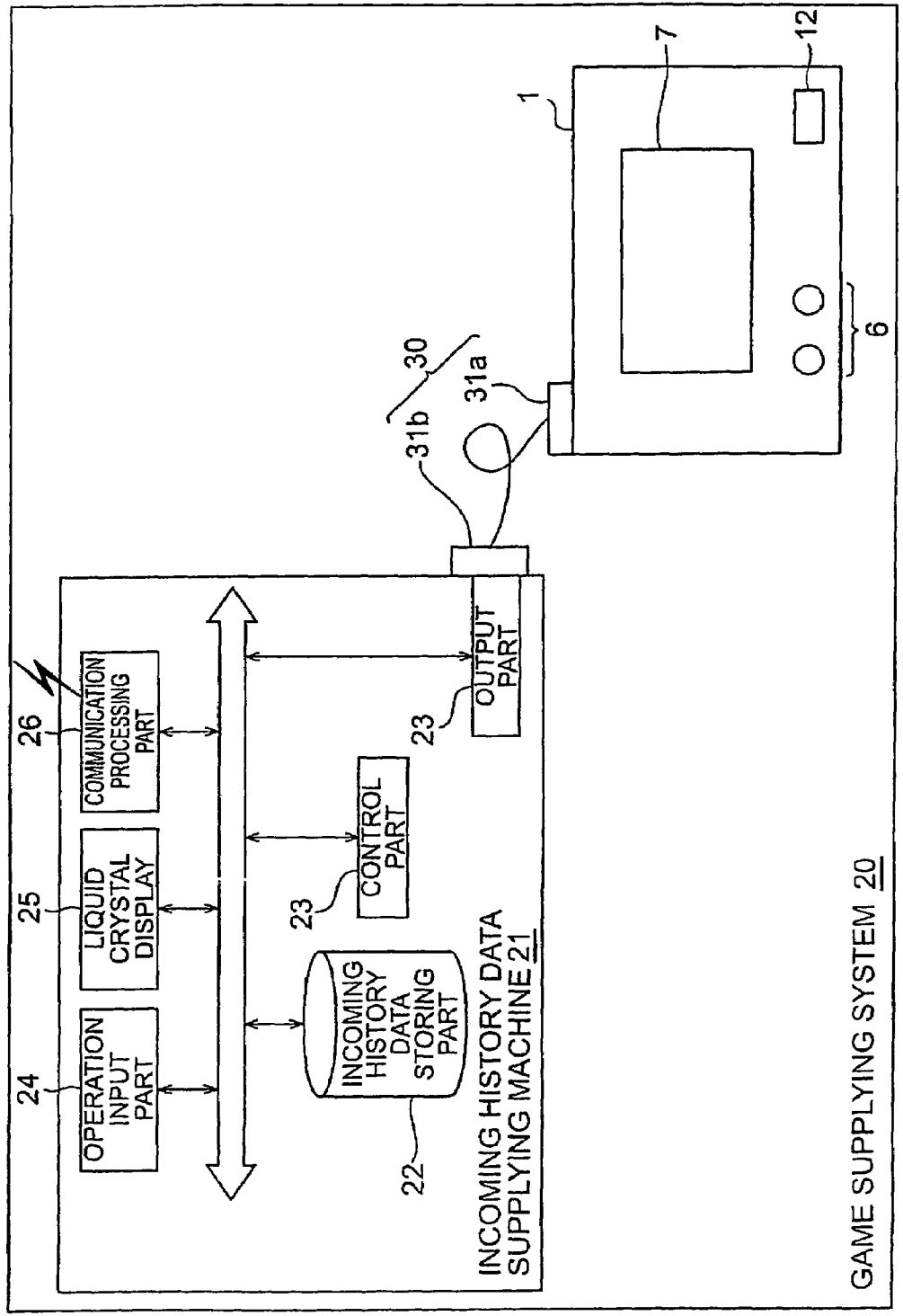
FIG. 1 is a system constitution diagram of an overall game supplying system including a gaming machine according to an embodiment of the present invention.

Here, FIG. 1 is a system constitution diagram of an overall game supplying system including a gaming machine according to the present embodiment.

As shown in FIG. 1, a game supplying system 20 has a portable gaming machine 1 and an incoming history data supplying machine 21, and is constituted to be capable of connecting the gaming machine 1 and the incoming history data supplying machine (hereinafter referred to as a "supplying machine") 21 through a connecting cable 30.

Figure 2:
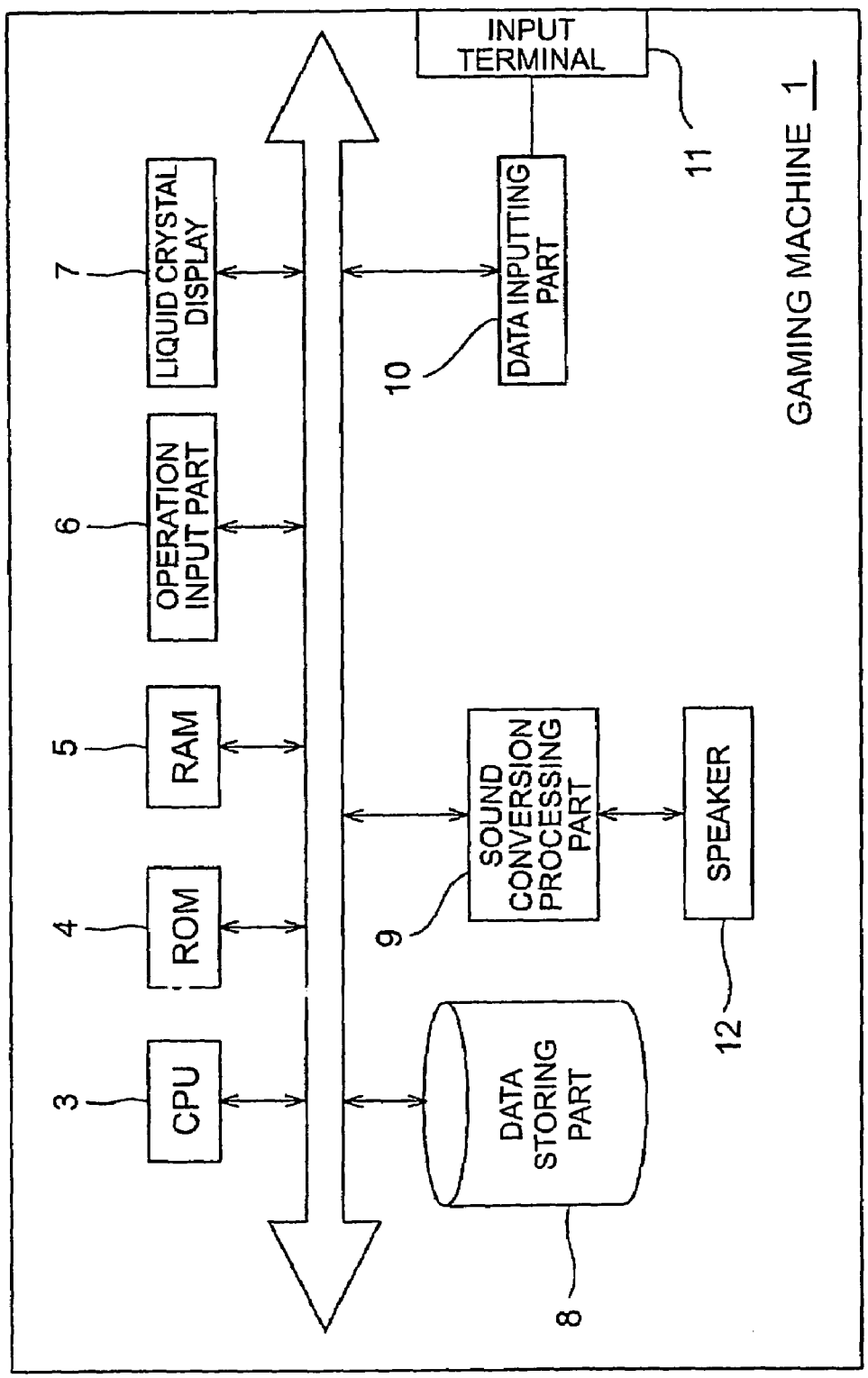
FIG. 2 is a constitution diagram showing a constitution of the gaming machine shown in FIG. 1.

The gaming machine 1 inputs incoming history data from the supplying machine 21 through the connecting cable 30, and can execute various games by use of the inputted incoming history data. As shown in FIG. 2, the gaming machine 1 includes a CPU (Central Processing Unit) 3, a ROM (Read Only Memory) 4, a RAM (Random Access Memory) 5, an operation input part 6, and a liquid crystal display 7. In addition, the gaming machine 1 further includes a data storing part 8, a sound conversion processing part 9, a data input part 10, an input terminal 11, and a speaker 12.

In the present embodiment, the gaming machine will be described citing an example of the portable gaming machine 1. However, the gaming machine 1 is not limited to a portable one, and may be a desktop one.

The CPU 3 operates in accordance with a program stored in the ROM 4. The CPU 3 performs the controlling of operations of the entire gaming machine 1, and operates as each unit which is a feature of the present invention. The ROM 4 stores a program which the CPU 3 is to execute. For example, the ROM 4 stores a game control program for controlling the execution of the game. The RAM 5 stores data needed for the execution of a program by the CPU 3.

The operation input part 6 has a plurality of operation input buttons, and inputs to the CPU 3 data which have been inputted through input manipulations of each of the operation input buttons. For example, the operation input part 6 has operation buttons through which input manipulations needed for execution of a game are performed, and a plurality of character input buttons. The liquid crystal display 7 has an LCD (Liquid Crystal Display) and its driving part, and is image displaying device for displaying images such as a character, a figure, a symbol and the like. For instance, the liquid crystal display 7 displays a game executing image to be displayed when executing the game, images of operation contents to be displayed when inputting incoming history data, and the like.

A data storing part 8 stores a game program and data (hereinafter referred to as "game data") for executing a game for each game, and furthermore is provided with an incoming history data storing part 14, which will be described later. Each set of game data is read from a storage medium, which is not illustrated, and is stored in the data storing part 8. A sound conversion processing part 9 expands sound data and outputs the sound data to a speaker 12. A data inputting part 10 operates in accordance with an instruction from the CPU 3, and inputs incoming history data supplied from the supplying machine 21. An input terminal 11 is a terminal for connecting a connecting cable 30 (specifically an input connector 31a of the connecting cable 30). The speaker 12 is sound output device for outputting a sound and a sound to be caused while a game is executed.

Figure 3:
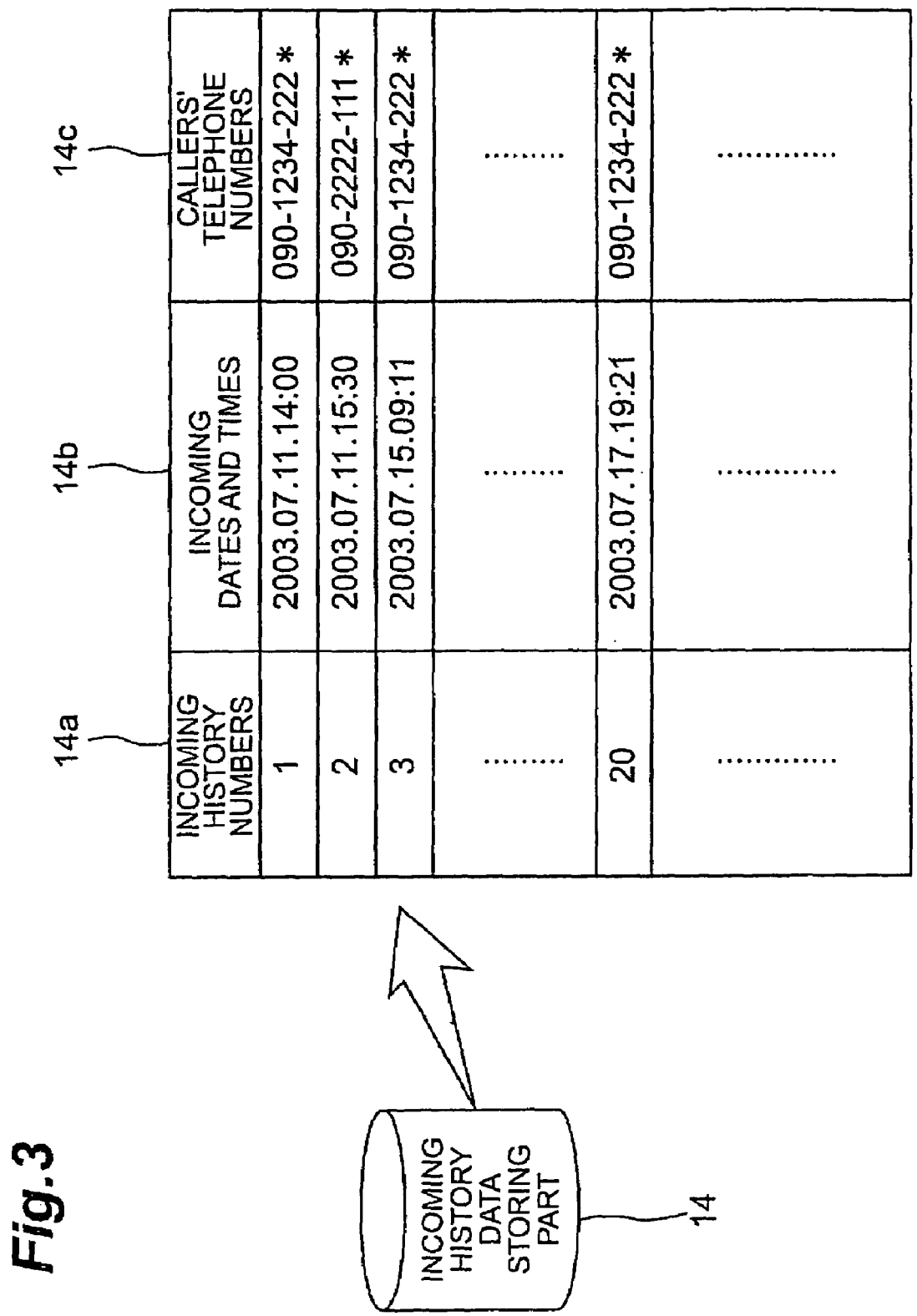
FIG. 3 is a diagram showing an incoming history data storing part, and data items of incoming history data.

An incoming history data storing part 14 is incoming history data storing device for storing incoming history data (data indicating a history of an incoming which has been performed by a below described communication processing part 26 of the supplying machine 21) to be inputted from the supplying machine 21. As shown in FIG. 3, the incoming history data storing part 14 has incoming history numbers 14a, incoming dates and times 14b and callers' telephone numbers 14c, and those are stored in association with each other. A serial number corresponding to the order in which the supplying machine 21 has generated each piece of incoming history data is stored in the incoming history numbers 14a. A date and time on which the supplying machine 21 has received an incoming is stored in the incoming dates and times 14b. A caller's telephone number which is informed by the caller's telephone when the incoming is received is stored in the callers' telephone numbers 14c.

As shown in FIG. 1, the supplying machine 21 comprises an incoming history data storing part 22, a control part 23, a operation input part 24, a liquid crystal display 25 and a communication processing part 26, and supplies incoming history data to the gaming machine 1. In the present embodiment, it is assumed that the supplying machine 21 is a mobile communication terminal such as a cellular phone which makes wireless sound communications, a PHS (Personal Handy Phone System) and the like, but the supplying machine 21 is not limited to such a terminal. In other words, the supplying machine 21 has the communication processing part 26 as communication device for making cable or wireless communications, but it suffices if the supplying machine 21 can generate incoming history data indicating a history of an incoming which the communication device has performed. The supplying machine 21 may be a fixed telephone, a facsimile, a public telephone, a personal computer, or any other communication machine which is not categorized as these.

The incoming history data storing part 22 stores incoming history data indicating a history of an incoming which has been performed by the communication processing part 26. This incoming history data storing part 22 has incoming history numbers, incoming dates and times and callers' telephone numbers which store information similar to the aforementioned incoming history numbers 14a, incoming dates and times 14b and callers' telephone numbers 14c, and those are stored in association with each other.

The control part 23 has a ROM and a RAM. The control part 23 operates in accordance with a program stored in the ROM, and controls operations of the entire supplying machine 21. The ROM stores a control program for controlling the operation of the supplying machine 21, and the RAM stores data to be used when the control part 23 operates. The operation input part 24 has a plurality of operation input buttons, and enters into the control part 23 data which have been inputted through input manipulations of each of the operation input buttons. For example, the operation input part 24 has a plurality of character input buttons, a button for sending a call button, a button for receiving a call and the like.

The liquid crystal display 25 has an LCD (Liquid Crystal Display) and its driving part, and is image displaying device for displaying images such as a character, a figure, a symbol and the like. For example, the liquid crystal display 25 displays a telephone number of the communicating counterpart of a user when an outgoing call is made, a present time, an incoming history, a received e-mail, a standby image, and additionally an image such as an output instruction button and the like to be used when an instruction for outputting incoming history data is made. The communication processing part 26 operates in accordance with an instruction from a CPU 31, and performs the transmitting and receiving of data by wireless communication. An output part 27 inputs incoming history data from the control part 23, and outputs the incoming history data from an output terminal, which is not illustrated, to the connecting cable 30 (the connector 31b of the connecting cable 30).

The connecting cable 30 is transferring device for transferring incoming history data, which are outputted from the supplying machine 21, to the gaming machine 1, and has the connector 31a which is to be connected to the gaming machine 1 and the connector 31b which is to be connected to the supplying machine 21. In the present embodiment, the connecting cable 30 is used, and incoming history data which are to be outputted from the supplying machine 21 are transferred to the gaming machine 1 by cable communication. However, the incoming history data may be transferred by wireless communication in accordance with Bluetooth or any other communication standard.

Figure 4:
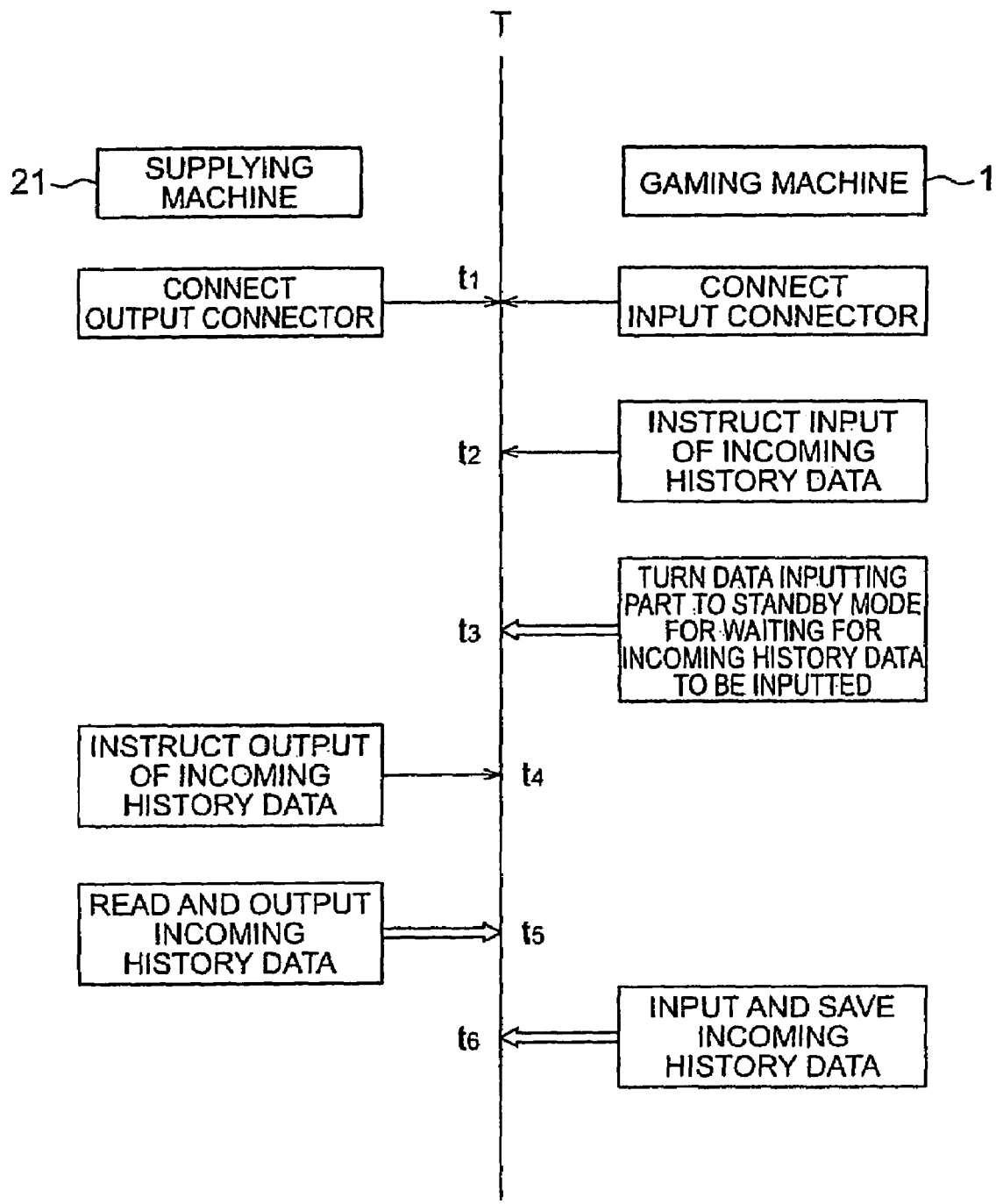
FIG. 4 is a chart showing in time sequence procedures of operations by a user in the gaming machine and a supplying machine to be performed when the incoming history data is supplied from the supplying machine to the gaming machine, and contents of the operations in the gaming machine and the supplying machine.

Next, a description will be provided for contents of operations by the game supplying system 20 which has the aforementioned constitution, focusing mainly on an operation procedure of the gaming machine 1. FIG. 4 is a chart showing in time sequence procedures of operations by a user in the gaming machine 1 and the supplying machine 21 to be performed when the supplying machine 21 supplies incoming history data to the gaming machine 1, and contents of the operations in the gaming machine 1 and the supplying machine 21. Incidentally, a longitudinal axis in the middle represents a temporal axis T. In the figure, it is assumed that time elapses from the top to the bottom. In addition, a narrow lined arrow heading from each step to the temporal axis T indicates a procedure of an operation by a user, and a double lined arrow indicates a content of an operation by the gaming machine 1 or the supplying machine 21.

As shown in FIG. 4, first of all, before a user plays a game with the gaming machine 1, the user inputs incoming history data from the supplying machine 21. In this case, at a time t1, the user connects the input connector 31a of the connecting cable 30 to the input terminal 11 of the gaming machine 1, and connects the output connector 31b to the output part 27 of the supplying machine 21.

Next, the user operates the operation input part 6 in the gaming machine 1 at a time t2, and makes an instruction for inputting the incoming history data. Then, the CPU3 operates in accordance with a control program stored in the ROM 4 at a time t3, and causes the data inputting part 10 to operate to be in a standby mode for waiting for the incoming history data to be inputted.

Then, the user operates the operation input part 24 in the supplying machine 21 at a time t4, and makes an instruction for outputting the incoming history data. By this, the control part 23 operates in accordance with a control program stored in the ROM, and accesses the incoming history data storing part 22 to read the stored incoming history data at a time t5. The control part 23 inputs the read incoming history data to the output part 27. The output part 27 outputs the inputted incoming history data from the output terminal.

Subsequently, at a time t6, when the CPU 3 detects through the input terminal 11 that the incoming history data has been inputted in the data inputting part 10, the gaming machine 1 accesses the data storing part 8, and causes the incoming history data inputted to the data inputting part 10 to be stored in the incoming history data storing part 14. Through the aforementioned steps, the gaming machine 1 can input the incoming history data to be supplied from the supplying machine 21, and can store the data in the data storing part 8.

Figure 5:
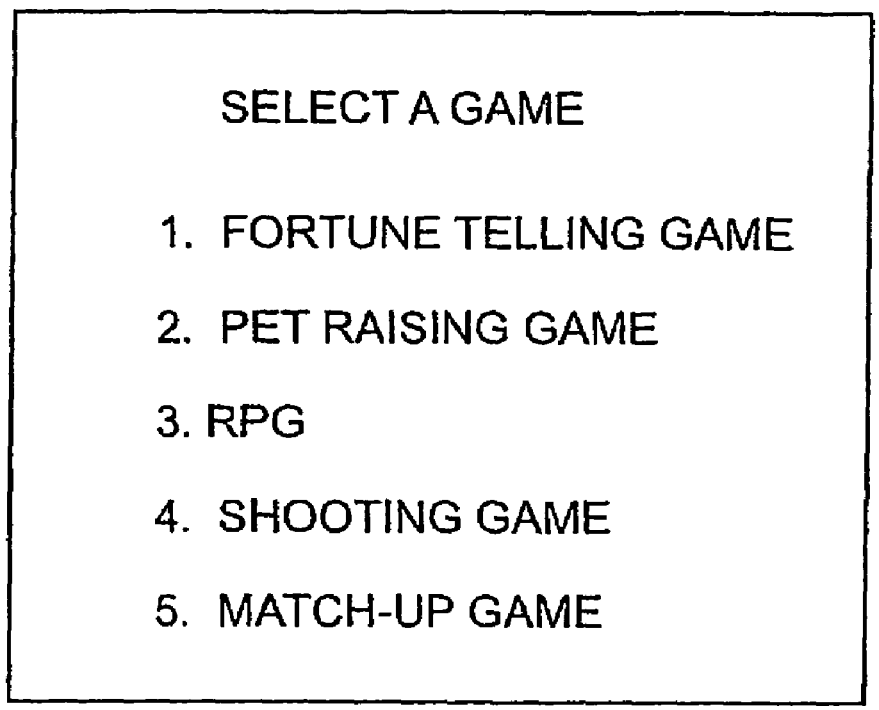
FIG. 5 is a view showing an example of a screen displaying a menu for games.

After the incoming history data are inputted through the aforementioned procedure, the user operates the operation input part 6 to select a game which he/she intends to play. The gaming machine 1 stands by until an instruction of a selected game from the user comes. Once the instruction of a selected game comes, the CPU 3 displays a game menu in the liquid crystal display 7. At this time, a game menu screen shown in FIG. 5 is displayed in the liquid crystal display 7. This game menu screen is a screen for selecting a desired game out of games capable of being executed by the gaming machine 1. As shown in FIG. 5, according to the present embodiment, the following 5 games are selectable: "1. fortune telling game, 2. pet raising game, 3. RPG (Role Playing Game), 4. shooting game, 5. match-up game."

Figure 6:
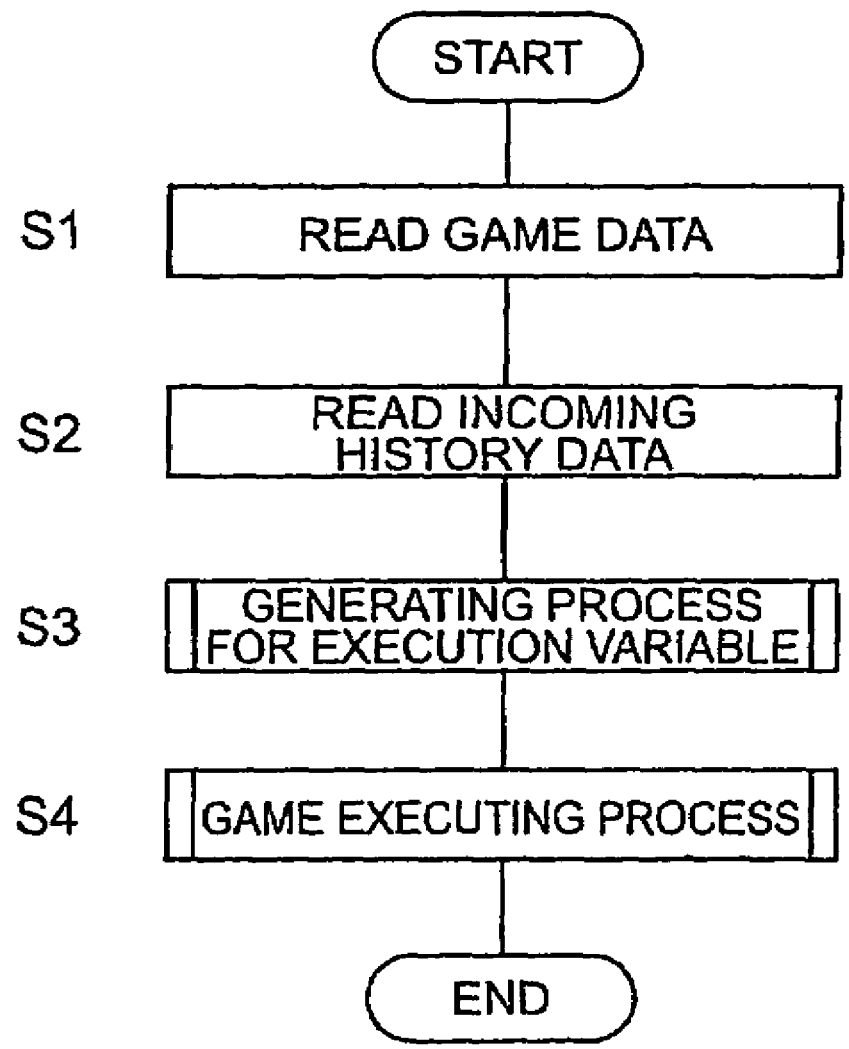
FIG. 6 is a flowchart showing an operating sequence of a game process to be performed in the gaming machine.

When a user of the gaming machine 1 selects a desired game (in this case, it is assumed that "1. fortune telling game" is selected) while referring to the game menu screen, the CPU 3 performs a game process for executing the selected game in accordance with the game control program along a flowchart shown in FIG. 6. FIG. 6 is a flowchart showing an operation sequence of a game process to be performed in the gaming machine 1. Incidentally, step is abbreviated to s in FIG. 6 and the below mentioned FIGS. 7 to 9.

Once the CPU 3 starts the game process, the CPU3 proceeds to step 1. The CPU 3 accesses the data storing part 8, and performs a process for reading game data which have been stored there. Subsequently, the CPU 3 proceeds to step 2. The CPU 3 accesses the incoming history data storing part 14 of the data storing part 8, and reads the stored incoming history data. Then, once the CPU 3 proceeds to step 3, the CPU 3 operates in accordance with a game program included in the game data which have been read in step 1, and performs a generating process for an execution variable. Here, the CPU 3 generates the execution variable, which will be described later, in accordance with a flowchart shown in FIG. 7.

Figure 7:
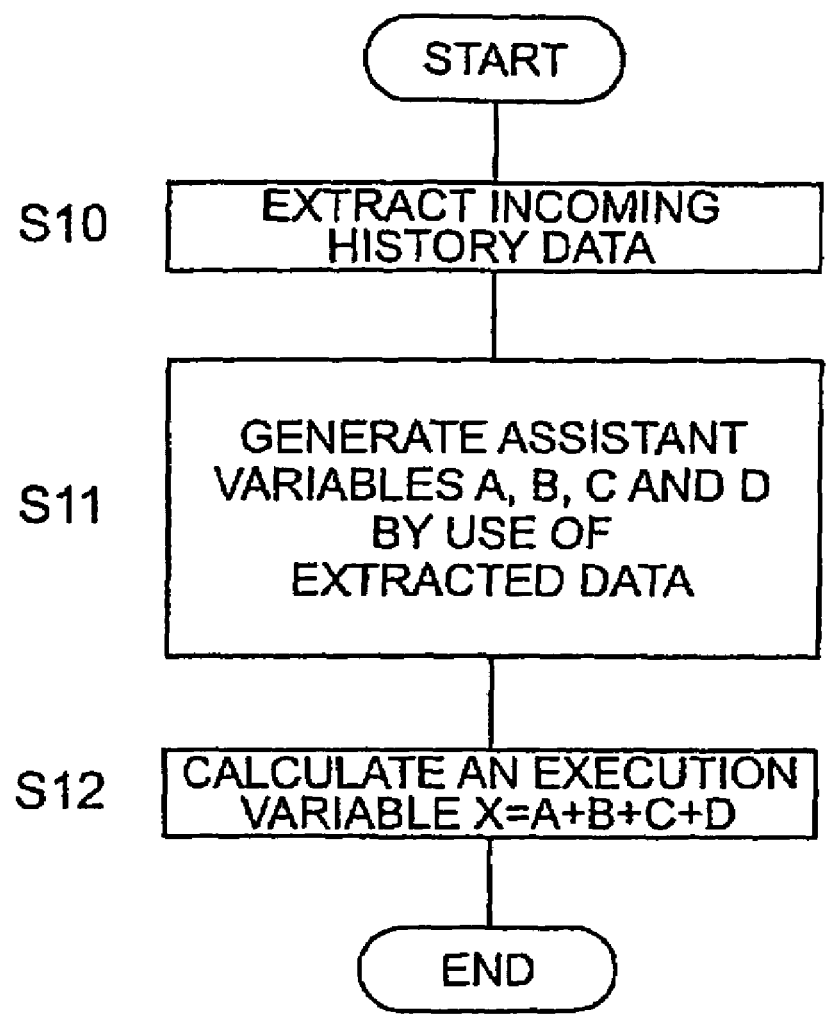
FIG. 7 is a flowchart showing an operating sequence of a generating process for an execution variable to be performed in the gaming machine.

Once the CPU 3 starts the generating process for an execution variable, the CPU 3 proceeds to step 10 shown in FIG. 7. The CPU 3 operates as extracting unit, and extracts incoming history data satisfying a predetermined condition out of the incoming history data which have been read in step 2. Various contents are conceivable as a condition (extracting condition) for extracting incoming history data. In the present embodiment, however, as an example, last twenty pieces of incoming history data (hereinafter these twenty pieces of incoming history data are referred to as a "first object data") are extracted out of the read incoming history data in order to generate an execution variable for changing a progress of a game (a fortune telling game) which a user has selected. Incidentally, a caller's telephone number ("090-1234-222*" in a case shown in FIG. 3) in the incoming history data which made the most frequent incomings in the first object data is referred to as an "extracted number."

Then, when the CPU 3 proceeds to step 11, the CPU 3 operates as execution variable generating unit, and performs the following processing prior to the generating of an execution variable. In other words, the CPU 3 finds assistant variables A, B, C and D for generating an execution variable X, on a basis of the incoming history data which have been extracted in step 10, in accordance with the following procedures 1 to 4.

The assistant variables A, B, C and D are calculated by paying attention to data attributes included in the incoming history data which have been extracted in step 10. As is described later, since a result of the execution of a game is changed by an execution variable X, it is preferable that the execution variable X is caused to have an irregular value (random value) in order to diversify a result of the execution of a game and to make a game more amusing. However, since the execution variable X is generated through a certain predetermined procedure, it is preferable that a plurality of assistant variables are prepared, which are generated through a procedure by which at least one of the plurality of assistant variables is random, and that the execution variable X is generated by use of the plurality of assistant variables. Use of such a plurality of assistant variables enables the execution variable X to have a random value if one of the plurality of assistant variables takes up a random value, even if the rest of the plurality of assistant variables take up regular values.

For this reason, in the present embodiment, the four assistant variables A, B, C and D are prepared, and each of them is generated through a procedure (the following procedures 1 to 4) by which at least one of the plurality of assistant variables is random. As long as the procedures 1 to 4 themselves are performed by the CPU 3, all the procedures are predetermined ones. However, the plurality of procedures are combined in order to make a generated assistant variable irregular.

As characteristics of data included in the incoming history data, there are ones of telephones from which a call is sent (a telephone from which a call is made is categorized into a general telephone, a cellular phone, a public telephone and an overseas telephone), a mode of displaying an incoming (whether or not it is a call with a hidden phone number), a date and time of an incoming, a time of an incoming.

Incidentally, the below-mentioned procedures 1 to 4 are examples of procedures for generating an execution variable X, and the execution variable may be generated through different procedures. For example, a presence or absence of a call with a hidden phone number and a time of the incoming may be combined in the third procedure.

Procedure 1 (A Procedure for Finding an Assistant Variable A)

If an extracted number represents "a general telephone," a remainder is found by dividing a number, which is obtained by summing up the last four digit numbers, by 3. Then, A is found by adding 2 to the remainder.

If an extracted number represents "a cellular phone," a remainder is found by dividing a number, which is obtained by summing up the last four digit numbers, by 3. Then, A is defined as the remainder.

If an extracted number represents "a public telephone," a remainder is found by dividing a number, which is obtained by summing up the last four digit numbers, by 3. Then, A is found by adding −1 to the remainder.

If an extracted number represents "any other telephone," a remainder is found by dividing a number, which is obtained by summing up the last four digit numbers, by 3. Then, A is found by adding −2 to the remainder.

In addition, if an extracted number is a caller's telephone number whose data account for more than 10 calls in the last 20 calls, A is found by adding −2 further. A is from −4 to 4.

Procedure 2 (A Procedure for Finding an Assistant Variable B)

Callers' telephone numbers whose incoming history numbers are even are selected out of the first object data. All the fourth digit numbers from the left of the selected callers' telephone numbers ("1" in a case of incoming history data whose caller's telephone number is "090-1234-222*") are summed up. Then, B1 is defined as a remainder which is found by dividing the sum by 6.

Callers' telephone numbers whose incoming history data are the twentieth (the date and time of the incoming call is latest), the tenth, the fifth and the first in the first object data are selected. All the last digit numbers of the selected callers' telephone numbers are summed up. Then, B2 is defined as a remainder which is found by dividing the sum by 6.

By this, B (B: 0-11) is defined as a remainder which is found by dividing the sum of B1 and B2 (B1+B2) by 12.

Procedure 3 (A Procedure for Finding an Assistant Variable C)

If the first object data includes no call with a hidden phone number but an overseas call, C is defined as "2."

If the first object data includes neither a call with a hidden phone number nor an overseas call, C is defined as "0."

If the first object data includes both a call with a hidden phone number and an overseas call, C is defined as "1."

If the first object data includes a call with a hidden phone number but no overseas call, C is defined as "−2." C is from −2 to 2.

Procedure 4 (A Procedure for Finding an Assistant Variable D)

If there are more then two missed calls, D is defined as "−3."

If there is only a missed call, D is defined as "−1".

If there is no missed call, D is defined as "0." D is from −3 to 0.

After step 11 is performed, the CPU 3 proceeds to step 12. A calculation in accordance with the below-mentioned conditional expression is made with the assistant variables A, B, C and D which have been found in step 11, and thereby an execution variable X (−9 to 17) is generated.

Conditional expression: X=A+B+C+D

Then, after step 12 is performed, the generating process for an execution variable is completed. The CPU 3 proceeds to step 4 shown in FIG. 6, and performs a game executing process in accordance with the game program. Once the CPU 3 starts the game executing process, the CPU 3 performs the process in accordance with a flowchart shown in FIG. 8. Here, a written oracle data which constitute fortune telling data indicating a result of a fortune telling is generated in accordance with the following examination procedure 1, in response to the execution variable X.

Examination Procedure 1

When the execution variable X is from −9 to −4: singular ill fortune.

When the execution variable X is from −3 to −1: ill fortune.

When the execution variable X is from 0 to 4: good fortune.

When the execution variable X is from 5 to 9: better fortune.

When the execution variable X is from 10 to 14: the best fortune.

When the execution variable X is from 15 to 17: the very best fortune.

Next, the CPU 3 proceeds to step 14. A process for diagnosing inter-personal relations by the execution variable X is performed, and fortune telling data is generated. Here, inter-personal diagnosis data concerning inter-personal relations of a user is generated as fortune telling data in accordance with the following examination procedure 2 in response to the execution variable X.

Examination Procedure 2

A user of a telephone whose caller's telephone number has an incoming history number equal to a remainder which is found by dividing the execution variable X by 10 is a "lucky person" from a viewpoint of a user of the gaming machine 1.

A user of a telephone whose caller's telephone number has an incoming history number equal to a number which is obtained by adding 10 to a remainder which is found by dividing the execution variable X by 10 is an "unlucky person" from a viewpoint of a user of the gaming machine 1.

Then, the CPU 3 proceeds to step 15, and makes an output corresponding to a result of a fortune telling by use of the fortune telling data which has been generated in steps 13 and 14. At this time, the CPU 3 operates as changing unit, and makes an instruction for changing the displaying of an image or sound outputs based on the fortune telling data. For example, the CPU 3 instructs the liquid crystal display 7 to display the fortune telling data (written oracle data and inter-personal diagnosis data) on the LCD. Or else, the CPU 3 instructs the sound conversion processing part 9 to output a sound corresponding to the fortune telling data from the speaker 12. After step 15 is performed, the game process shown in FIG. 6 is completed.

As described above, in the gaming machine 1, the incoming history data is inputted from the outside (the supplying machine 21 in the present invention), and the execution variable for changing a progress of a game (a fortune telling game in the above description) is generated by use of the incoming history data. A result of the execution of a game by use of the execution variable is obtained, and an image corresponding to fortune telling data indicating the result of the executing of the game is designed to be displayed on the liquid crystal display 7 (and/or a sound is designed to be outputted from the speaker 12). Consequently, with progress contents of a game, a result of the executing of the game is designed to change in response to the incoming history data, and also displayed contents of the liquid crystal display 7 (and/or contents of a sound output of the speaker 12) is designed to change.

Furthermore, the incoming history data which change a result of the execution of a game is updated from time to time, and the update timing is also irregular. In addition, since the incoming history data are usually generated not at the will of a user of the gaming machine 1 but by an incoming from the communicating counterpart of the user, the will of the user is not reflected, and the predictability is also low. Additionally, since the incoming history data are updated from time to time, a progress of game can be changed to an extent of being unpredictable, and consequently the game can be made amusing. Besides, it suffices if a user gets the supplying machine 21 and the connecting cable 30 ready in addition to the gaming machine 1. Unlike gaming machines described in the aforementioned Patent Document 1 and 2, the gaming machine 1 can execute a game whose progress changes to an extent of being unpredictable with scores of cards, merchandise and the like being not got ready. To this end, no troubles or costs are required.

In addition, incoming history data are updated randomly, and can not be predicted. For this reason, if a match-up game is executed by use of the incoming history data, the degree of difficulty in winning the match-up game can be made higher. In addition, with regard to the incoming history data, types of the data are not restricted. For this reason, contents which vary in the game can be made wide-ranging compared to a case that determined data are used.

It should be noted that, according to the above description, since the incoming history data have been stored in the incoming history data storing part 14 and data satisfying a predetermined condition is extracted out of them, incoming history data can be stored only in a certain amount. For this reason, even if the number of incoming history data intended to be inputted is large, an execution variable is designed to be capable of being generated in accordance with a certain condition. The gaming machine 1 according to the present embodiment suffices as long as an execution variable can be generated from incoming history data. The incoming history data do not have to be stored. Ones which satisfy a predetermined condition do not have to be extracted. For example, if the number of incoming history data is small, an execution variable may be generated for each piece of incoming history data, without storing the incoming history data.

Another Example of a Game

Next, a description will be provided for a case that a user of the gaming machine 1 selects "2. pet raising game" referring to a game menu screen shown in FIG. 5. Incidentally, in this case, it is assumed that an image which has been taken by imaging device, which is not illustrated, is registered (hereinafter referring to this registered image as a "registered image") in the gaming machine 1. As a registered image, an image of the face of one of the user's friends is conceivable.

In addition, before the user selects "2. pet raising game," the gaming machine 1 inputs incoming history data from the supplying machine 21, and stores the data in the incoming history data storing part 8, through procedures similar to those to be performed when the aforementioned "1. fortune telling game" is selected. The CPU 3 reads such as read game data corresponding to the selected "2. pet raising game," and performs the aforementioned steps 1 to 3. At this time, in step 10 shown in FIG. 7, the CPU 3 operates as extracting device, and extracts incoming history data satisfying a predetermined extracting condition out of incoming history data which have been read in step 2. Here, last 20 pieces of incoming history data (hereinafter referring to these 20 pieces of incoming history data as "second object data") are extracted out of incoming history data whose incoming date and time belong to a certain time span (for example, time spans between 8:00 and 9:00, between 12:00 and 13:00 and between 19:00 and 20:00) in accordance with an extracting condition for the pet raising game.

Next, in steps 11 and 12, the CPU 3 operates as execution variable generating device, finds the assistant variables A, B, C and D, and thereby generates the execution variable X through the aforementioned procedures. Subsequently, once the CPU 3 starts a game executing process in step 4, the CPU 3 starts the process along a flowchart shown in FIG. 9, and executes the game by use of the execution variable X. At this time, in step 17, the CPU 3 selects food corresponding to the execution variable X, and generates raising data for determining growth contents of the object to be raised. For example, if an object to be raised (a pet intended to be raised) is a dog, any one of "bread," "dog food," "fish" and "meat" is selected in response to the execution variable X, and raising data corresponding to each of them are generated.

Next, the CPU 3 proceeds to step 18, and a pet growing process is performed on a basis of the raising data which have been generated in step 17. In this case, an image data in which the degree of the growth of the pet is changed (growth image data) are generated in response to the raising data. In other words, an image of the pet (pet image) which has been created by placing a registered image in the portion of the face of the pet is modified in response to the raising data, and is processed. The growth image data is generated in this manner. Then, the CPU 3 proceeds to step 19. The CPU 3 outputs the growth image data which have been generated in step 18 by an image display, and outputs a result of the growth (the raising of the pet). At this time, the CPU 3 operates as changing unit, and makes an instruction for displaying the growth image data. Then, the CPU 3 instructs the liquid crystal display 7 to display an image of the grown pet on the LCD. After step 19 is performed, a process shown in FIG. 6 is completed.

In this case, too, the execution variable is generated by use of the incoming history data, and a result of the executing of the game by use of the execution variable is obtained. The growth image data indicating the result of the executing is designed to be displayed on the liquid crystal display 7. Consequently, with progress contents of a game, a result of the executing of the game is designed to change in response to the incoming history data, and displayed contents of the liquid crystal display 7 is also designed to change. For this reason, even if the user gets ready nothing but the gaming machine 1, the supplying machine 21 and the connecting cable 30, the progress of game can be changed to an extent of being unpredictable, and the game can be made more amusing.

Particularly in the case of the aforementioned pet raising game, the pet image which has been created by placing the face in the registered image of a friend of the user is caused to change in response to the incoming history data. This enables the game to be made more amusing. When the number of incomings from the same communicating counterpart is large in the supplying machine 21 to supply incoming history data, the pet image becomes similar to the communicating counterpart in many cases, this enables the game to be made further amusing. Incidentally, in the pet raising game, instead of the pet image, other pet raising tips (for example, discipline and a nurturing method) may be changed.

In the above description, the description has been provided citing the case that a progress of game changes on a basis of incoming history data and accordingly the displaying of an image or sound output changes. Instead, however, producing device for a sticker with a photo of the face of a user himself/herself (e.g. producing device for a sticker in Print Club (registered trade mark), or in what is called Puri Kura) may be mounted in the gaming machine, and framing image (a themed background for the image) may be changed by use of the incoming history data. Since this makes the framing image change irregularly, the gaming machine becomes more convenient for a user. In addition, when a progress of game is caused to change on a basis of incoming history data, for example, graphics of characters or a battle parameter in the RPG may be changed. Also, images and sounds of scene displays in the shooting game as well as weapon displays may be changed.

According to the present invention, a progress of game can be diversified extensively, and a game amusing to a user can be executed, with saving troubles and costs.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A gaming system comprising:
    a communication device receiving incoming communications and sending outgoing communications, the communication device being selected from the group consisting of telephones and facsimile machines and including
        first incoming communications history data storing means storing incoming communications history data of each incoming communication received by the communication device, the incoming communications history data including time of receipt of each incoming communication and an identifying number of each incoming communication to the communication device, and
        output means for outputting the incoming communications history data that has been stored;
    a gaming machine for playing games, the gaming machine including
        input means for connection to the output means of the communication device for receiving from the communication device the incoming communications history data stored in the first incoming communications history data storing means,
        image displaying means for displaying an image,
        execution variable generating means, supplied with the incoming communications history data from the input means, for generating execution variables based on the incoming communications history data that is supplied, the execution variables changing prowess of games executed by the gaming machine, and
        game executing means for executing the games using the execution variables generated by the execution variable generating means.

2. The gaming system according to claim 1, wherein the gaming machine further comprises:
    second incoming communications history data storing means for storing incoming communications history data received from the communications device; and
    extracting means for extracting from the incoming communications history data, stored in the second incoming communications history data storing means, the incoming communications history data satisfying a predetermined condition, wherein the execution variable generating means generates the execution variables using the incoming communications history data extracted by the extracting means.

3. The gaming system according to claim 1, wherein the execution variable generating means generates the execution variables using a plurality of assistant variables, at least one of which varies randomly.

4. The gaming system according to claim 1, wherein the game executing means includes:
    a generating unit generating, using the execution variable, fortune telling data indicating a fortune; and
    a changing unit generating an instruction to change the displaying of an image on the image displaying means, using the fortune telling data generated by the generating unit.

5. The gaming system according to claim 1, wherein the game executing means includes:
    a generating unit generating, using the execution variables, raising data for determining growth of an object to be raised; and
    a changing unit generating an instruction to change the displaying of an image on the image displaying means, using the raising data generated by the generating unit.

6. The gaming system according to claim 1, wherein the communication device receives incoming communications wirelessly.

7. The gaming system according to claim 1, wherein the communication device receives incoming communications through wires.

8. The gaming system according to claim 1, further including a cable connecting the output means of the communication device to the input means of the gaming machine.

9. The gaming system according to claim 1, wherein the identifying number of each incoming communication is a telephone number of the incoming communication source.

10. A method of operating a gaming system, the method comprising:
    receiving incoming communications at a communication device selected from the group consisting of telephones and facsimile machines;
    storing, for each incoming communication received by the communication device, incoming communications history data, including time of receipt of each incoming communication and an identifying number of each incoming communication;
    supplying the incoming communications history data that has been stored to a gaming machine;
    generating execution variables based upon the incoming communications history data that has been supplied, the execution variables changing progress of the games executed by the gaming machine; and
    executing the games on the gaming machine using the execution variables generated based upon the incoming communications history data supplied.

11. The method of claim 10 including
    extracting from the incoming communications history data supplied, incoming communications history data satisfying a predetermined condition; and
    generating the execution variable using the incoming communications history data that has been extracted.

12. The method according to claim 10 including generating the execution variables using a plurality of assistant variables, at least one which varies randomly.

13. The method according to claim 10 including, in executing the game, generating, using the execution variables, fortune telling data indicating a fortune, and changing a display in response to the fortune telling data that is generated.

14. The method according to claim 10 including, in executing the game, generating, using the execution variables, raising data for determining growth of an object to be raised, and changing a display in response to the raising data that is generated.

15. The method according to claim 10, wherein the incoming communications are received wirelessly.

16. The method according to claim 10, wherein the incoming communications are received through wires.

17. The method according to claim 10, wherein the identifying number of each incoming communication is a telephone number of the incoming communication source.

* * * * *